US008746115B2

(12) United States Patent
Hecht

(10) Patent No.: US 8,746,115 B2
(45) Date of Patent: Jun. 10, 2014

(54) CUTTING INSERT HAVING HOLE ORIENTATION INDICIA AND METHOD FOR MAKING THEREOF

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 38 days.

(21) Appl. No.: 13/452,586

(22) Filed: Apr. 20, 2012

(65) Prior Publication Data

US 2013/0177360 A1    Jul. 11, 2013

Related U.S. Application Data

(60) Provisional application No. 61/584,428, filed on Jan. 9, 2012.

(51) Int. Cl.
*B23B 27/00* (2006.01)
*B23B 47/00* (2006.01)

(52) U.S. Cl.
USPC ............................ 82/1.11; 407/113; 407/114

(58) Field of Classification Search
CPC ...... B23B 1/00; B23B 47/00; B23B 2200/00; B23B 2200/08; B23B 2200/20; B23B 2200/36; B23B 2200/3618; B23B 2265/00
USPC ................... 407/113, 114, 115, 117; 82/1.11; 283/70
See application file for complete search history.

(56) References Cited

U.S. PATENT DOCUMENTS

| D390,854 | S | * | 2/1998 | Satran et al. | D15/139 |
| D396,479 | S | * | 7/1998 | Satran et al. | D15/139 |
| 5,791,832 | A | * | 8/1998 | Yamayose | 407/113 |
| 6,123,488 | A | * | 9/2000 | Kasperik et al. | 407/113 |
| 6,190,096 | B1 | | 2/2001 | Arthur | |
| 7,008,146 | B2 | | 3/2006 | DeRoche et al. | |
| 8,142,113 | B2 | * | 3/2012 | Ishida | 407/113 |
| 8,210,777 | B2 | * | 7/2012 | Ishida | 407/113 |
| 8,388,274 | B2 | * | 3/2013 | Chen et al. | 407/113 |
| 2004/0223818 | A1 | | 11/2004 | Sheffler et al. | |
| 2010/0272522 | A1 | | 10/2010 | Hecht | |

OTHER PUBLICATIONS

Search Report dated Apr. 10, 2013 issued in PCT counterpart application (No. PCT/IL2012/050524).

* cited by examiner

*Primary Examiner* — Will Fridie, Jr.
(74) *Attorney, Agent, or Firm* — Womble Carlyle

(57) ABSTRACT

A cutting insert includes a first surface, a second surface and a peripheral surface extending therebetween, and an insert hole extending between the first and second surfaces and having a hole axis. A cross section of at least a portion of the insert hole taken perpendicular to the hole axis has an oval shape. The cutting insert also includes a mark provided on at least one of the first and second surfaces, indicating the orientation of the cross sectional oval shape of the at least a portion of the insert hole.

4 Claims, 3 Drawing Sheets

CUTTING INSERT HAVING HOLE ORIENTATION INDICIA AND METHOD FOR MAKING THEREOF

RELATED APPLICATIONS

This application claims priority to U.S. Provisional Patent Application No. 61/584,428, filed 9 Jan. 2012. The content of the above-identified application is incorporated by reference in its entirety.

FIELD OF THE INVENTION

The present invention relates to cutting inserts, for use in metal cutting processes, and to a method for making such cutting inserts.

BACKGROUND OF THE INVENTION

Cutting inserts which are removably secured in a cutting body are provided with a suitably hard material, i.e. cemented carbide, in the vicinity of the cutting edge, where the cutting body, manufactured from a less hard material, is reusable following the disposal of a worn or damaged cutting insert. Cutting inserts are clamped within an insert receiving pockets located on the periphery of the tool body, for holding and supporting the cutting inserts during operation against a workpiece. Cutting inserts are known in the art, having indicia or marking thereon, to indicate to an operator a direction of indexing of the cutting insert.

U.S. Pat. No. 7,008,146 issued to DeRoche, et al., and entitled "Milling Cutter with Tangentially Mounted Inserts", is directed to an indexable cutting insert for a milling cutter tool, including a first and a second face surfaces, first and second long edge surfaces, and first and second radiused shorter edge surfaces. Each long edge surface defines a primary cutting edge that extends from a substantially flat central plateau, through a first facet face, through a second facet face adjacent the first facet face, through a third facet face adjacent the second facet face to one of the first and second radiused shorter edge surfaces. The second facet face is disposed between the first facet and the third facet face. The cutting insert includes a locating dimple for assisting in the positioning of the cutting insert in the cutting tool.

U.S. Pat. No. 6,190,096 issued to Arthur, and entitled "Indexable Cutting Insert with Indexing Marks", is directed to an indexable cutting insert which presents a rake face and a flank face. The rake face and the flank face intersect to form a generally circular cutting edge. At least one of the flank face and the rake face has a visually perceivable indicia thereon, to indicate a plurality of discrete indexable positions of the circular cutting insert.

U.S. Pat. No. 6,123,488 issued to Kasperik et al., and entitled "Cutting Insert with Universal Identification", is directed to a cutting insert with marks of triangular shapes imprinted on the top surface thereof. The number of triangular shapes in each mark is representative of the cutting range for which the cutting insert will function best. The mark enables the machine operator to determine if the cutting insert is suited in one extreme for roughing applications and in another extreme for fine finishing applications with intermediate uses therebetween. The mark includes geometries which are not alpha-numeric characters and preferably a single geometry is presented in different quantities to indicate uses from roughing to finishing applications. The marks are positioned approximately perpendicular to their associated cutting edges to indicate the type of usage recommended for that cutting edge. When a mark is associated with each cutting edge, such marks may be symmetrically spaced adjacent the respective cutting edge. When there is only a single mark, such a mark may be placed anywhere in the non-active region of the cutting insert.

U.S. Patent Application Publication Number 2010/0272522 to Hecht, and entitled "Cutting Insert and Cutting Insert Assembly", is directed to a cutting insert assembly having an insert pocket with a pocket bore, a cutting insert and a fastening member coupling the cutting insert in the insert pocket. The cutting insert has a cutting insert bore, a first surface, a second surface and a peripheral surface extending therebetween. The first and second surfaces meet the peripheral surface at first and second peripheral edges, respectively, at least a portion of at least one of the first and second peripheral edges form a cutting edge. The cutting insert bore has at least two portions, the smallest of which having an oval cross section allowing a for quick replacing or indexing of the cutting insert, without having to completely remove the fastening member from the pocket bore.

When an operator approaches the cutting insert in order to remove it from the insert receiving pocket, there may be a difficulty in determining the orientation of the oval shape of the cutting insert bore portion, which would indicate the direction of rotation of the cutting insert required for releasing the insert from the fastening member. This difficulty may arise due to the small size of the cutting insert and the cutting insert bore, due to poor lighting conditions of the insert bore while the fastening member is still present therein, and the like.

It is an object of the present invention to provide an improved cutting insert, and a method for making thereof, the cutting insert having an indicia or a mark thereon, indicating an orientation of an non-circular cross-section of the insert hole thereof.

SUMMARY OF THE INVENTION

In accordance with the present invention, there is provided a cutting insert comprising a first surface, a second surface and a peripheral surface extending therebetween. The cutting insert further includes an insert hole extending between the first and second surfaces and having a hole axis. A cross section of at least a portion of the insert hole taken perpendicular to the hole axis has an oval shape. The cutting insert also includes a mark provided on at least one of the first and second surfaces, indicating the orientation of the cross sectional oval shape of the at least a portion of the insert hole.

In accordance with another embodiment of the present invention, there is provided a method for making a cutting insert, having a first surface, a second surface and a peripheral surface extending therebetween, and an insert hole extending between the first and second surfaces and having a hole axis. The insert hole has at least a portion with an oval shape cross section, taken perpendicular to the hole axis. The method comprises the procedure of marking at least one of the first and second surfaces of the cutting insert, with a mark for indicating the orientation of the cross sectional oval shape of the at least a portion of the insert hole.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

The present invention relates to a cutting insert having hole orientation indicia and a method for making thereof, the cutting insert having a mark thereon, indicating an orientation of an cross-sectional oval shape of an insert hole of the cutting insert.

Figure 1A:
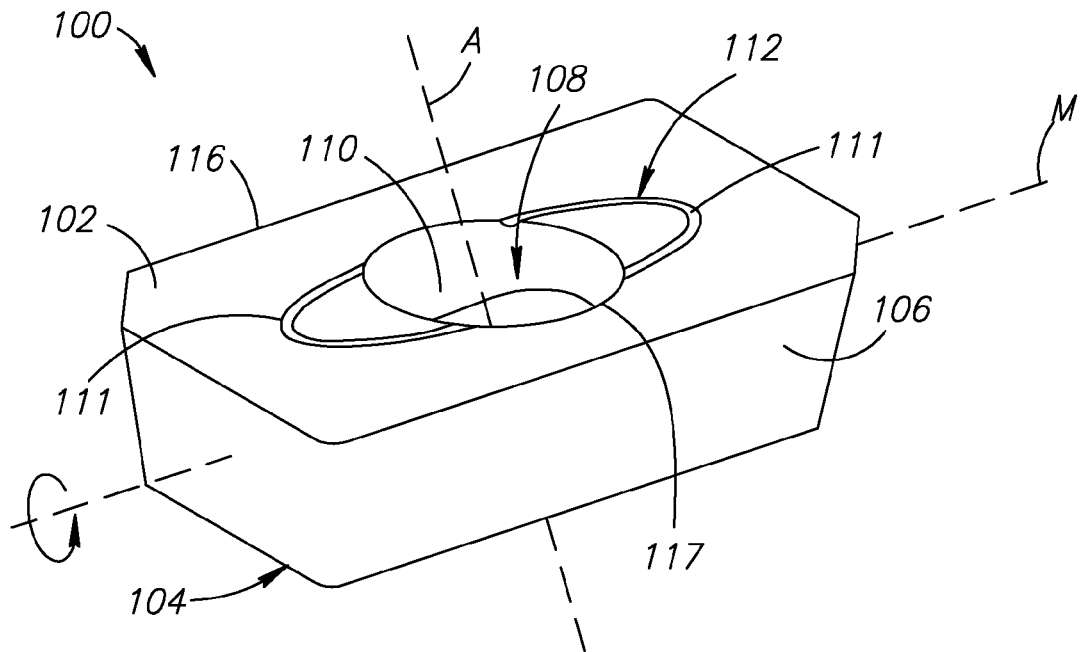
FIG. 1A is a perspective view of a rectangular indexable cutting insert according to an embodiment of the disclosed technique.
Figure 1B:
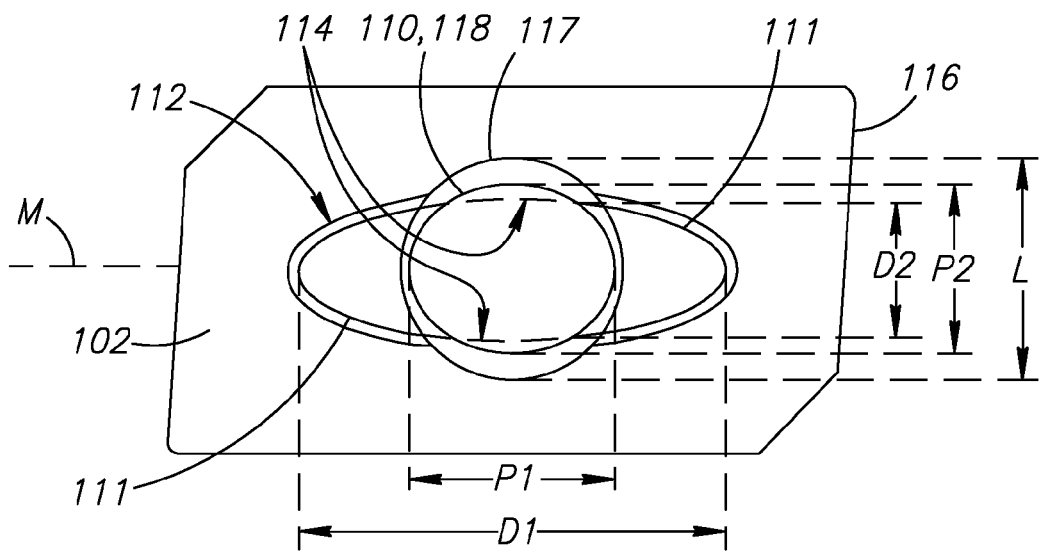
FIG. 1B is a top view of the indexable cutting insert of FIG. 1A.
Figure 2A:
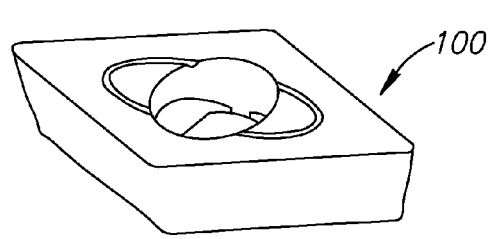
FIG. 2A is a perspective view of a rhombus indexable cutting insert according to another embodiment of the disclosed technique.
Figure 2B:
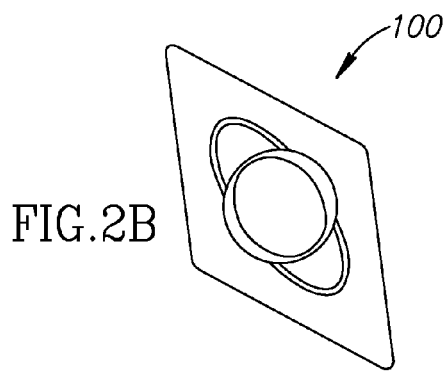
FIG. 2B is a top view of the indexable cutting insert of FIG. 2A.
Figure 3A:
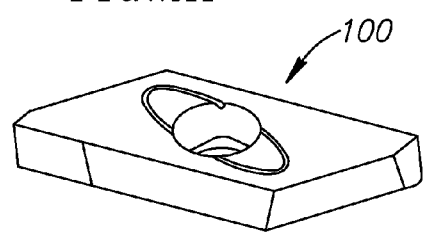
FIG. 3A is a perspective view of a parallelogram indexable cutting insert according to a further embodiment of the disclosed technique.
Figure 3B:
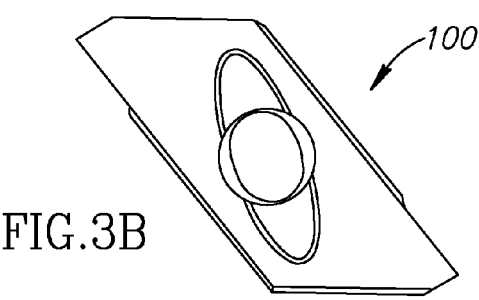
FIG. 3B is a top view of the indexable cutting insert of FIG. 3A.
Figure 4A:
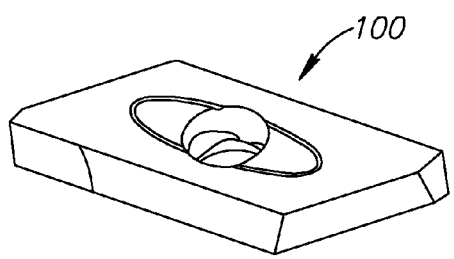
FIG. 4A is a perspective view of a parallelogram indexable cutting insert according to another embodiment of the disclosed technique.
Figure 4B:
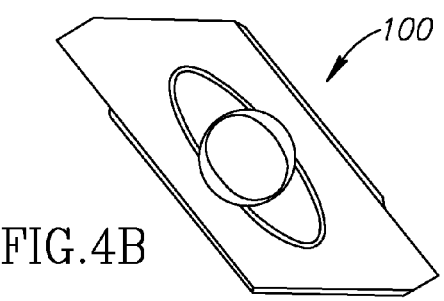
FIG. 4B is a top view of the indexable cutting insert of FIG. 4A.
Figure 5A:
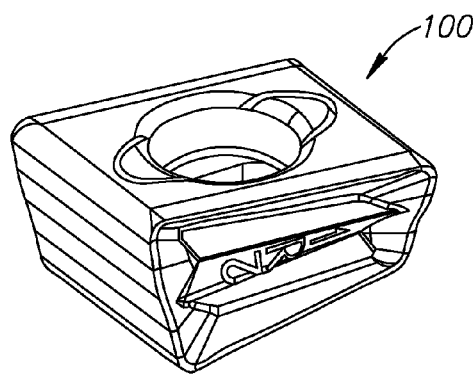
FIG. 5A is a perspective view of a parallelogram indexable cutting insert according to a further embodiment the disclosed technique.
Figure 5B:
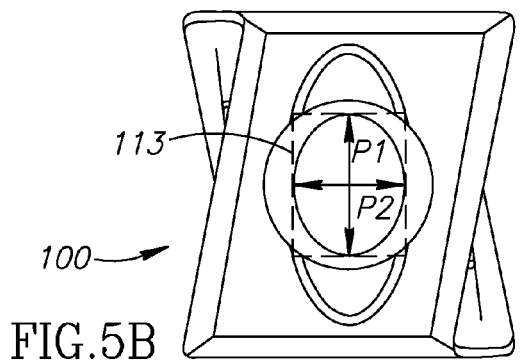
FIG. 5B is a top view of the indexable cutting insert of FIG. 5A.

Reference is made to FIGS. 1A-5A and 1B-5B, depicting indexable cutting inserts 100 in accordance with embodiments of the present invention. With particular reference to FIGS. 1A and 1B, the cutting insert 100 includes a first surface 102, a second surface 104, a peripheral surface 106, an insert hole 108, and a mark 112. Cutting insert 100 has an indexing axis A, passing through insert hole 108, and perpendicular to first surface 102 and second surface 104. The intersection of peripheral surface 106 with first surface 102 defines a cutting edge 116.

Cutting insert 100 is rotated about indexing axis A, in order to present a new unused cutting edge portion (not shown) to be employed against a workpiece in cutting actions. Indexing axis A may also be referred to as a hole axis A, since it presents a rotational symmetry of insert hole 108. Insert hole 108 passes through insert 100, and opens out to first surface 102 at an opening contour 117, and to second surface 104. Opening contour 117 is a circular contour having a contour diameter L. Insert hole 108 includes a hole portion 110 having an cross sectional oval shape 118, when taken perpendicular to hole axis A, for example as viewed in FIG. 1B. Oval shape 118 has a primary dimension P1 and a secondary dimension P2, perpendicular to the primary dimension P1. Primary dimension P1 is typically larger than secondary dimension P2, due to the elongated layout of oval shape 118. Cutting insert 100 further has a screw-releasing axis M, passing through the center of cutting insert 100, and parallel to primary dimension P1, to first surface 102 and to second surface 104.

It should be noted, that the oval shape cross section of hole portion 110 allows for extraction of cutting insert 100 over a clamping screw head (not shown), without entirely removing the clamping screw out of a threaded bore of a insert receiving pocket (both not shown). In order to remove cutting insert 100 from the clamping screw, the screw is released to a predetermined amount, however still remaining partially threaded into the threaded bore of the insert receiving pocket, and cutting insert 100 is rotated about screw-releasing axis M. This allows for insert hole 108 to be passed over the clamping screw head, thereby releasing cutting insert 100 from the clamping screw, which is still partially threaded into the insert receiving pocket. Since screw-releasing axis M is parallel to primary dimension P1, the direction of turning required in order to release cutting insert 100 is indicated by orientation of primary dimension P1.

Mark 112 is located on first surface 102, conforming to an oval shape imaginary line 114, having a major dimension D1 and a minor dimension D2, perpendicular to the major dimension D1. Major dimension D1 is typically larger than minor dimension D2, due to the elongated dimension of oval shape imaginary line 114. The orientation of major dimension D1 is substantially similar to the orientation of primary dimension P1 of oval shape 118, when viewed perpendicular to hole axis A. Major dimension D1 is larger than primary dimension P1. Mark 112 clearly indicates the orientation of major dimension D1 to an operator of cutting insert 100. Thus, the orientations of primary direction P1, and of oval shape 118, are also clearly indicated to the operator. When required, the operator may release the clamping screw to the required predetermined amount, and then rotate cutting insert 100 around the orientation of major dimension D1, which is parallel to screw-releasing axis M, until cutting insert is released out of the insert receiving pocket.

In cutting insert 100, mark 112 includes two visible curved lines 111, conforming to parts of oval shape imaginary line 114. Minor dimension D2 is typically smaller than contour diameter L. Thus, a section of oval shape imaginary line 114 lies within opening contour 117 of hole 108, and may not be marked. In this manner, only curved lines 111 can be marked on first surface 102, and be clearly visible to the operator.

Thus, when viewed along the hole axis A, the non-circular insert hole 108 may be considered to have an associated minimum bounding rectangle 113 (shown in FIG. 5B), defined by a first, maximal dimension (e.g., primary dimension P1) of the insert hole and a second, transverse dimension (e.g., secondary dimension P2), which is perpendicular to the first, maximal dimension, with mark 112 on surfaces 102 and/or 104 indicating the orientation of minimum bounding rectangle 113.

Figure 6A:
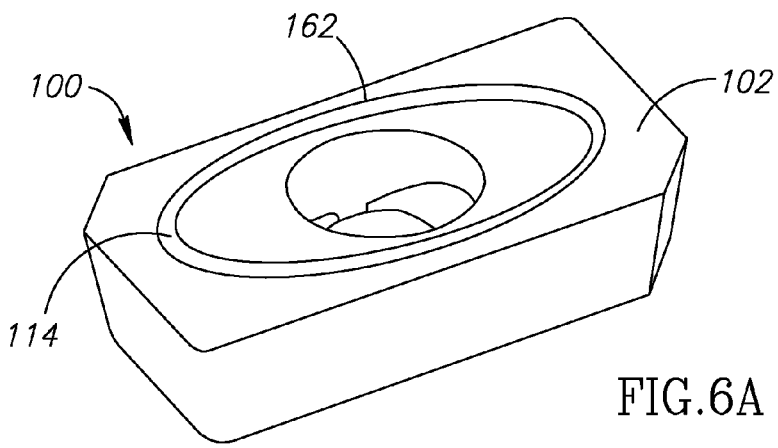
FIG. 6A is a perspective view of a rectangular indexable cutting insert according to a further embodiment of the disclosed technique.
Figure 6B:
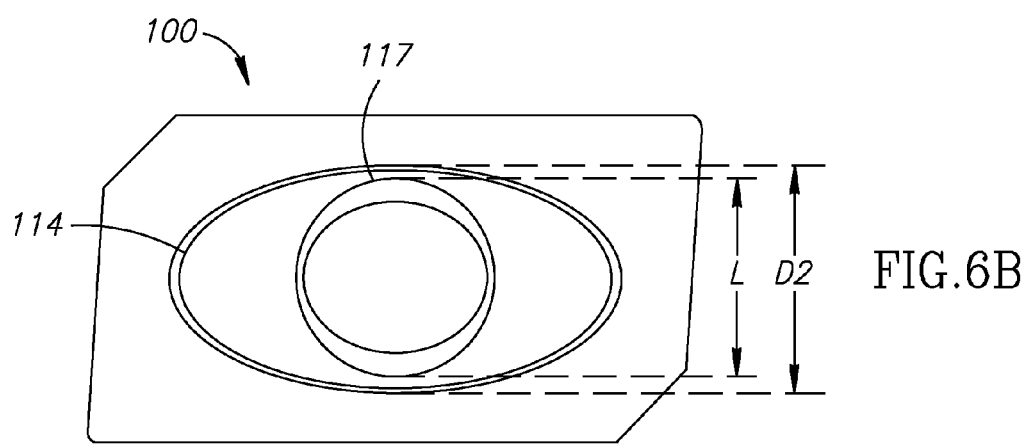
FIG. 6B is a top view of the indexable cutting insert of FIG. 6A.

Now referring to FIGS. 6A and 6B, according to an alternative embodiment of the disclosed technique, in cutting insert 100, minor dimension D2 of oval shape imaginary line 114 is greater than the contour diameter L (i.e., D2>L). In this case, it is possible to create a mark 162 along the entirety of oval shape imaginary line 114, surrounding the opening contour 117.

Figure 7:
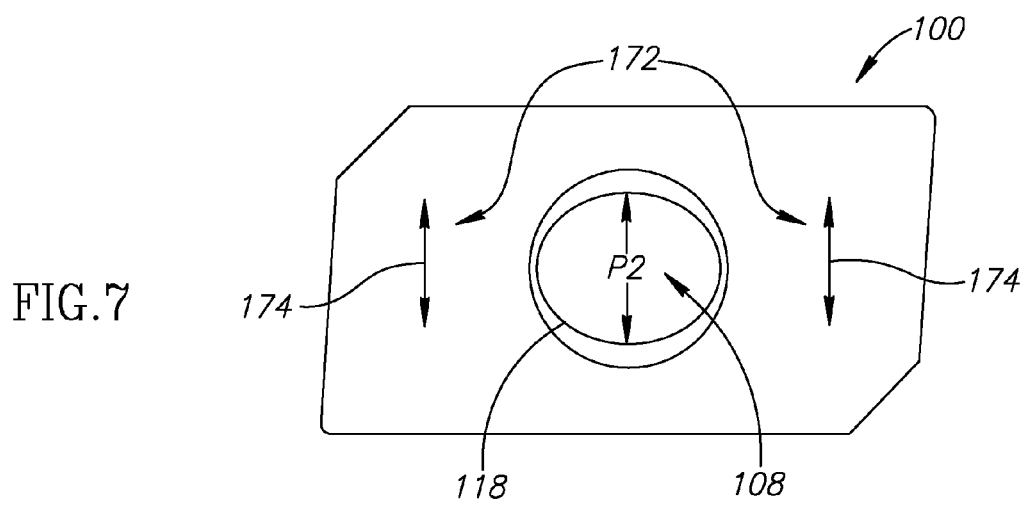
FIG. 7 is a top view of an indexable cutting insert according to another embodiment of the disclosed technique.

Reference is made to FIG. 7, depicting a further alternative embodiment of the disclosed invention. According to this embodiment, cutting insert 100 includes a mark 172 on the first surface thereof. Mark 172 includes two double-sided arrows 174, located on opposite sides of hole 108, and parallel to secondary dimension P2 of cross sectional oval shape 118. Double-arrows 174 indicate to the operator the orientation of cross sectional oval shape 118, thereby indicating the direction in which the operator must rotate cutting insert 100 in order to release cutting insert 100 off of the clamping screw head, as elaborated herein above.

It is noted, that if the cutting insert according to the present invention is a reversible cutting insert, the cutting insert may include another mark, similar to marks 112, 162 or 172, on the second surface thereof (e.g., second surface 104), to indicate the orientation of the oval shape cross section of the hole portion, when viewed from the second surface.

The cutting inserts according to the disclosed technique are employed in metal cutting actions, and are preferably constructed of a hard metal, e.g., cemented carbide, a hard material which is not easily processed. Thus, the marks (e.g., marks 112, 162, 172) on the surfaces of the cutting inserts may be provided by any known marking method, which can mark hard metal. Examples for such marking methods are laser marking or engraving. Marking may even be accomplished during the insert production process by incorporating the mark into a die used to form the cutting insert through, e.g., pressing or injection molding. In such case, the mark may constitute a raised contour on the surface of the finished insert.

Although the present invention has been described to a certain degree of particularity, it should be understood that various alterations and modifications could be made without departing from the spirit or scope of the invention as hereinafter claimed.

What is claimed is:

1. A method for making a cutting insert (100), having a first surface (102), a second surface (104) and a peripheral surface (106) extending therebetween, and an insert hole (108) extending between the first and second surfaces (102, 104) and having a hole axis (A), with a cross section of at least a portion (110) of the insert hole (108) taken perpendicular to the hole axis (A) having an oval shape (118), the method comprising the procedure of:

marking at least one of the first and second surfaces (102, 104) of the cutting insert (100), with a mark (112, 162, 172) for indicating the orientation of the cross sectional oval shape (118) of the at least a portion (110) of the insert hole (108).

2. The method for making a cutting insert according to claim 1, wherein the procedure of marking is performed by laser marking.

3. The method for making a cutting insert according to claim 1, wherein the procedure of marking is performed by engraving.

4. The method for making a cutting insert according to claim 1, wherein the procedure of marking is performed by incorporating the mark into a die used to form the cutting insert.

* * * * *